(12) United States Patent
Dutta et al.

(10) Patent No.: US 7,562,131 B2
(45) Date of Patent: Jul. 14, 2009

(54) UPNP USER INTERFACE SYSTEM AND METHOD

(75) Inventors: Pronay Dutta, Beaverton, OR (US); Ylian Saint-Hilaire, Hillsboro, OR (US); Bryan Y. Roe, Camas, WA (US); Nelson F. Kidd, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 10/876,903

(22) Filed: Jun. 25, 2004

(65) Prior Publication Data

US 2006/0080382 A1   Apr. 13, 2006

(51) Int. Cl.
*G06F 15/173* (2006.01)
*G06F 15/16* (2006.01)

(52) U.S. Cl. .................. 709/223; 709/219; 709/229
(58) Field of Classification Search ............ 709/223, 709/229
See application file for complete search history.

(56) References Cited

U.S. PATENT DOCUMENTS

| 6,448,958 | B1* | 9/2002 | Muta ............... 345/169 |
| 2003/0200340 | A1* | 10/2003 | Hutter ............ 709/250 |
| 2004/0027375 | A1* | 2/2004 | Ellis et al. ........ 345/753 |
| 2006/0288343 | A1* | 12/2006 | Pallister .......... 717/168 |

OTHER PUBLICATIONS

Lea, R., et al. "Networking Home Entertainment Devices With HAVI". Computer, IEEE Computer Society. vol. 33, No. 9, Sep. 1, 2000. Long Beach, CA.*
MediaRenderer: 1; Device Template Version 1.01, Ritchie, John, Intel Corporation, Jun. 25, 2002.
MediaServer: 1; Device Template Version 1.01, Ritchie, John, Intel Corporation, Jun. 25, 2002.
UPnP AV Architecture: 0.83, Ritchie, John et al., Intel Corporation et al., Jun. 12, 2002.

* cited by examiner

*Primary Examiner*—Jeffrey Pwu
*Assistant Examiner*—Willow Noonan
(74) *Attorney, Agent, or Firm*—Schwabe, Williamson & Wyatt, P.C.

(57) ABSTRACT

A system, apparatus and method for remoting a user interface from a UPnP server to a UPnP client are described herein.

25 Claims, 4 Drawing Sheets

UPNP USER INTERFACE SYSTEM AND METHOD

FIELD OF THE INVENTION

The present invention relates to the field of data processing. More specifically, the present invention is related to "remoting" a user interface to a UPnP client from a UPnP server.

BACKGROUND

Advances in microprocessor related technology have lead to widespread development and the adoption of computing devices. Computing powers that used to be available only in expensive mainframe computers requiring special operating environments are now available in many personal-computing devices. The form factors vary from desktop, laptop, palm sized and so forth. A number of these computing devices are packaged as "purpose" devices, such as set top boxes, entertainment personal digital assistants ("PDA"), pagers, text messengers, smart appliances and wireless mobile phones.

Concurrently, advances in networking, telecommunications and related technologies, in particular, in the area of wireless networking/communications, have lead to increased connectivity between computing devices, over local, private, wide area, and/or public networks. Of particular notoriety is the Internet.

Together, these and other related factors contributed to the availability of rich content and functionality available from a variety of server devices for consumption and/or application on a variety of client devices. Recently, this trend of connected consumption/application of content and services has made significant advances in the home operating environment.

To facilitate interchangeability and ease of employment of a wide range of devices to interact with such content and services, the UPnP networking and a number of related technologies are being developed by members of the UPnP Forum. These specifications specify the protocols and services to be supported by UPnP devices in UPnP networks.

However, these specifications do not specify the user interface through which UPnP client devices will interact with UPnP servers. Furthermore, there is no indication of how UPnP client devices will obtain appropriate user interfaces through which their operations are to be controlled.

BRIEF DECRIPTION OF THE DRAWINGS

The present invention will be described by way of exemplary embodiments but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The present invention includes a user and developer friendly technique for remoting a user interface from a UPnP server to a UPnP client.

In the following description, various aspects of the present invention will be described. However, it will be apparent to those of ordinary skill in the art and others that the present invention may be practiced with only some or all of the aspects of the present invention. For purposes of explanation, specific numbers, materials and configurations are set forth in order to provide a thorough understanding of the present invention. However, it will be apparent to those of ordinary skill in the art and others that the present invention may be practiced without the specific details. In other instances, well-known features are omitted or simplified in order not to obscure the present invention.

The various operations will be described as multiple discreet steps in turn, in a manner that is most helpful to understanding of the present invention. However, the order of description should not be construed to imply that these operations are necessarily order dependent. In particular, these operations may not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Figure 1:
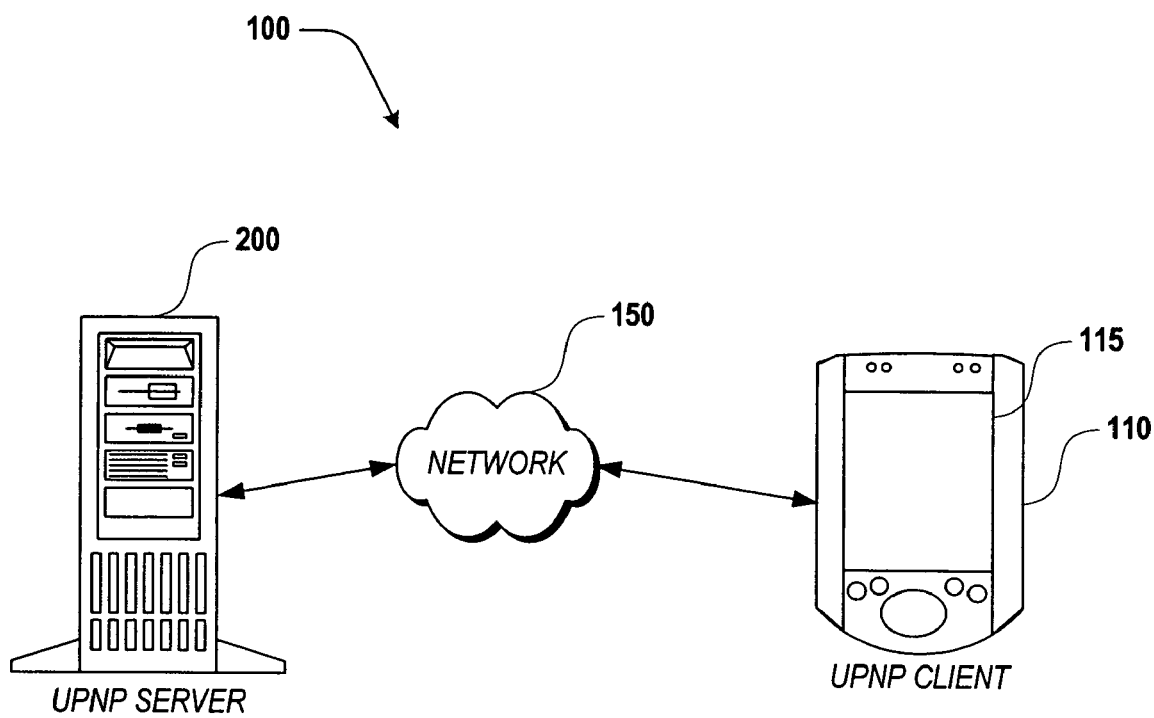
FIG. 1 illustrates a system view of an example operating environment suitable for use to practice the present invention, in accordance with one embodiment.
Figure 2:
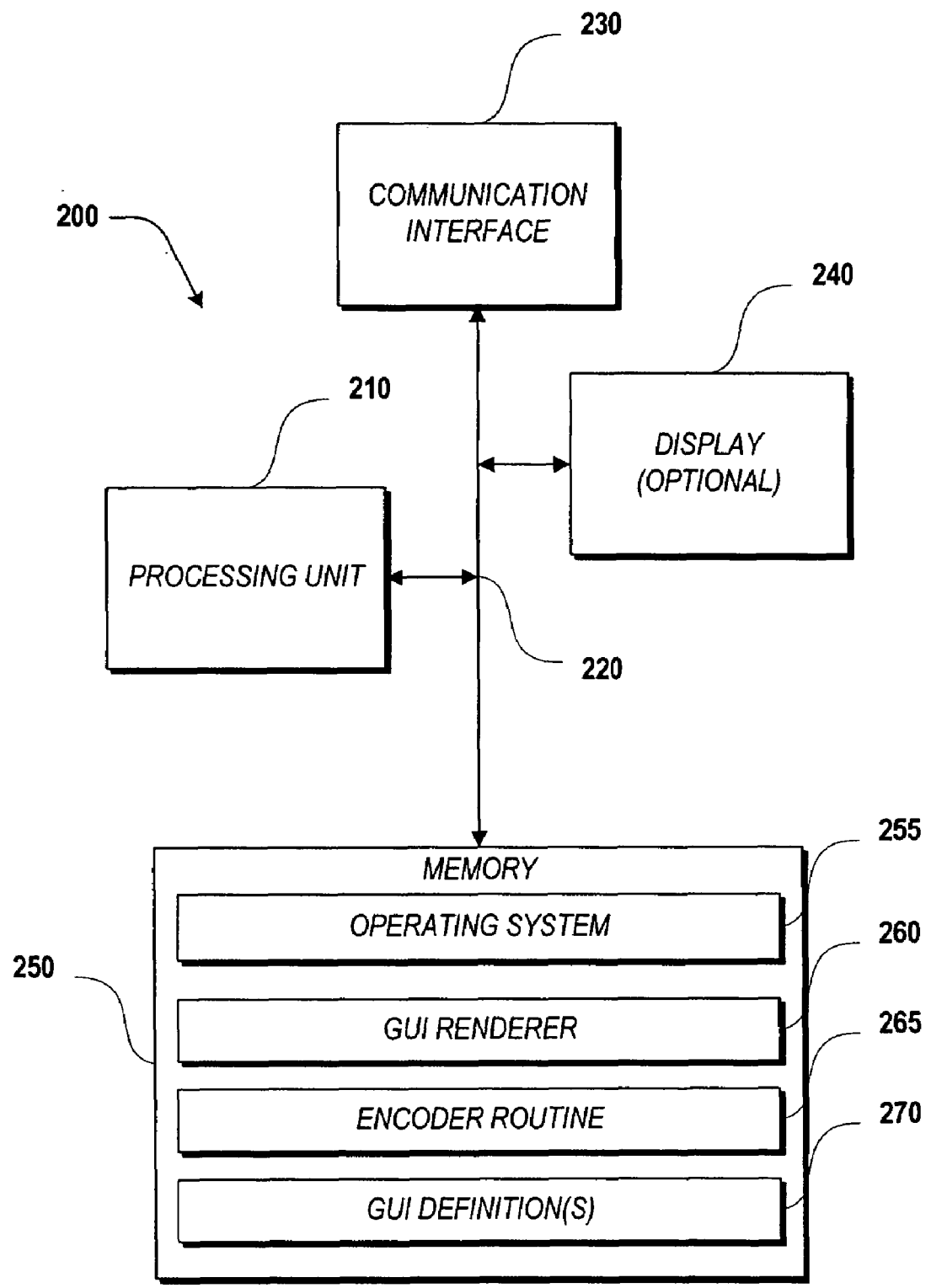
FIG. 2 illustrates an architectural view of a device suitable for use as an UPnP server, in accordance with one embodiment.

Referring now to FIG. 1, wherein an overview of an example operating environment incorporated with the teachings of the present invention, in accordance with one embodiment, is shown. As illustrated, example operating environment 100 includes UPnP server 200, a network 150 and UPnP client 110 (having a display 115), operationally coupled to each other, as shown, via a network 150. UPnP server 200 may comprise a number of components. FIG. 2 illustrates one exemplary embodiment of a UPnP server 200, which is described below.

In various embodiments, the UPnP server 200 and UPnP client 110 are coupled to each other wirelessly, i.e., they are members of a wireless network. In other embodiments, the UPnP server 200 and UPnP client 110 are coupled to each other as members of a wire-based network. Regardless of the manner the UPnP server 200 and UPnP client are coupled to each other, for various embodiments, UPnP server 200 and UPnP client 110 are equipped to operate in accordance with the UPnP protocols and specifications promulgated by the UPnP Forum. In various embodiments, UPnP client 110 may be a device to operate in the role of a UPnP control point to control one or more UPnP rendering devices to render media content available from UPnP server 200 or other UPnP servers, in accordance with the UPnP protocols and specifications. Thus, the terms UPnP server and clients, as used herein, for the purpose of this specification, including the claims, shall be interpreted with the meaning of the server and client being so equipped and communicate with each other, i.e. in accordance with UPnP protocols and specifications.

In various embodiments, a UPnP client 110 may be a low-end device that might not have a local input functionality. However, the UPnP client 110 it would still have the ability to display a GUI image sent from the UPnP server 200.

In one exemplary embodiment, the user interface of the UPnP client 110 is a graphical user interface. An example of a graphical user interface is an interactive web page, e.g., in HTML (HyperText Markup Language), Flash, JavaScript, VBScript, JScript, PHP (HTML Preprocessor) or XHTML (eXtensible HyperText Markup Language) form.

Resultantly, since users are generally familiar with the user interfaces of web pages, including sophisticated web pages such as Flash-enabled web pages from Macromedia, Incorporated of San Francisco, Calif., consumption of client device services using a web page based graphical user interface on a client device 110 (e.g., displayed on the client display 115) may be made familiar and user friendly. Further, as will be apparent from the description below, legacy web-based user interface definitions may be easily made available and rendered by the UPnP server.

In one embodiment, operating environment 100 is a home-computing environment.

FIG. 2 illustrates an exemplary UPnP server 200 suitable for use in embodiment of the present invention. In alternate embodiments, the UPnP server 200 may include many more components of those shown in FIG. 2. However, it is not necessary that all of these generally conventional competing components be shown in order to disclose an enabling embodiment for practicing the present invention. As shown in FIG. 2, the UPnP server 200 includes a communications interface 230, which, in some embodiments of the present invention, may be a Network Interface Controller ("NIC"). The inter-device communications of the communications interface 230 may be designed to support a local area network, wide area network, personal area network, telephone network, power line network, serial bus or wireless connection. Such a communications interface 230 would also include the necessary circuitry, driver(s) and/or transceiver for such a connection and would be constructed for use with the appropriate transmission protocols for such connections.

The UPnP server 200 also includes a processing unit 210, an optional display 240 and a memory 150, all interconnected along with the communications interface 230 via a bus 220. The memory 250 generally comprises a random access memory ("RAM"), a read only memory ("ROM") and a permanent mass storage device, such as a disk drive, flash RAM or the like. The memory 250 stores an operating system 255, a graphical user interface ("GUI") renderer 260, an encoder module 265 and GUI definition(s) 270 While for ease of understanding, operating system 255, GUI renderer 260, encoder module 265 and GUI definition(s) 270 are described as separate software components, in alternate embodiments, they may be comprised of multiple software components, implemented in hardware, or subparts of one or more integrated software components. Additionally, in alternate embodiments, memory 250 may further store a generator (not shown) equipped to generate the GUI definitions 270.

The GUI definitions 270 may comprise user interface elements (such as scroll bars, buttons, and so forth) for a user to control one or more UPnP rendering devices (not shown) to render media contents available from UPnP server 200 or other UPnP server. The GUI renderer 260, in various embodiments, may be a specific module designed to process GUI definitions and render them. Nevertheless, in some embodiments the GUI renderer is a browser module (e.g., Internet Explorer, Netscape, Safari, etc.) adapted to render familiar browser files (e.g., HTML, Flash, JavaScript, VBScript, JScript, PHP and XHTML files and the like.) For selected ones of UPnP client 110 (equipped with appropriate complementary decoders), at least some output of such rendering is directed to the encoder module 265 before being sent to UPnP client 110.

It will be appreciated that the software components may be loaded from a computer readable medium into memory 250 of the UPnP 200 using a mechanism (not shown) associated with the computer readable medium such as a floppy, tape, DVD (Digital Versatile Disk)/CD (Compact Disk)-ROM drive, flash RAM or communications interface 230.

In various embodiments, the communications interface 230 may facilitate the connection of remote devices to the UPnP server 200. For example, devices for reading and/or writing in machine readable media, digital cameras, printers, digital music players/recorders (such as MP3 players, etc.), Smart appliances, televisions, and the like. Various input mechanisms may also be coupled to the UPnP server 200 such as, for example, keyboards and/or mice (not shown).

Figure 3:
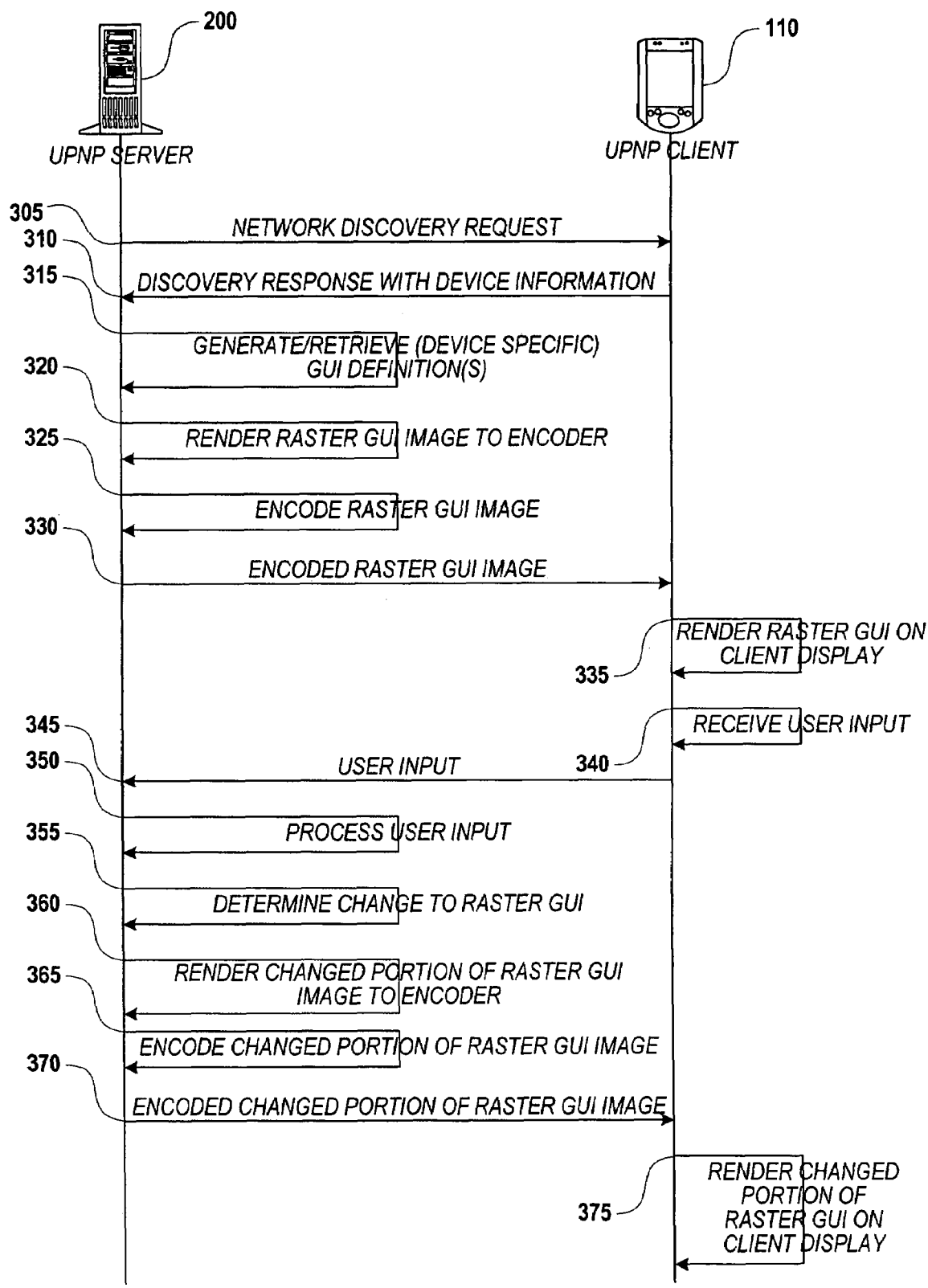
FIG. 3 illustrates an overview of the protocol and methods for the UPnP server to interact with and control the UPnP client device, in accordance with one embodiment.

In embodiments of the present invention the UPnP server 200 obtains a user interface (often a GUI) definition and renders it electronically at the UPnP server but "remotes" (e.g. delivers to a remote location in an interactive manner) the user interface to a UPnP client 110. FIG. 3 illustrates one exemplary series of application level communications between a UPnP server 200 and a UPnP client 110 in accordance with various embodiments. As described earlier, the application level communications are performed in accordance with the UPnP protocol. In FIG. 3, the communications begin with a network discovery request 305. The UPnP client 110 returns a discovery response 310 to the UPnP server 200 with device information about the UPnP client 110. For the illustrated embodiments, the device information includes decoding and display capabilities of the UPnP client 110. The UPnP server 200 then generates/retrieves 315 a user interface definition or definitions that may or may not be UPnP client device specific. Next, an image of the GUI (e.g. a raster image) is rendered 320 (e.g., with GUI renderer 260) at the UPnP server 200. The UPnP server 200 then encodes 325 the encoded GUI image (e.g., with encoder 265) into a format for communicating and/or viewing on the UPnP client 110. The encoded GUI image 320 is communicated to the UPnP client 110. The UPnP client 110 then decodes and depicts the encoded GUI image 335 on the client display 115. Next, the UPnP client 110, in various embodiments, receives the 340 user input and communicates 345 user input back to the UPnP server 200. In various embodiments, the GUI interface may be designed to allow UPnP client 110 to also provide commands to other UPnP server/rendering devices in parallel or without providing to UPnP server 200 (e.g. those commands with no effect on the GUI).

In various embodiments, different transmission protocols for "remoting" the user interface and receiving user inputs may be employed. For example, Microsoft Corporation of Redmond, Wash. has a remote desktop protocol ("RDP") which may be employed in one embodiment of the present invention for remoting a desktop user interface and receiving user input to the desktop user interface. However, in other embodiments of the present invention the extended personal computer remoting technology version 2 protocol ("XRT2") may be employed as a simple TCP based command encapsulation protocol for passing messages back and forth between the UPnP server 200 and UPnP client 110. XRT2 is a protocol that is suited to send display drawings and receive user input (such as keystroke commands from a keyboard and/or mouse movements and clicks). The XRT2 protocol was developed by and is made available by Intel Corporation of Santa Clara, Calif. In alternate embodiments, still other protocols may be used to provide a GUI image to a UPnP client 110 and receive user input from the UPnP client 110 to the UPnP server 200.

Returning to FIG. 3, once the UPnP server 200 receives user input the user input is processed 350. The UPnP server 200 then determines 355 whether there was a change to the GUI and, if so, renders 360 the changed portion of the GUI (up to and including a complete change of the GUI image) to the encoder (e.g. encoder module 265). The changed portion of the GUI image is then encoded 365 and the encoded changed portion of the GUI image is sent 370 to the UPnP client 110. The UPnP client 110 then decodes and renders the changed portion of the GUI on the client display 115 to update 375 the GUI.

In various embodiments, the communications described above and shown in FIG. 3 are merely one exemplary set of communications between the UPnP server 200 and the UPnP client 110. Other communications, both more and fewer, may be employed in other embodiments.

Figure 4:
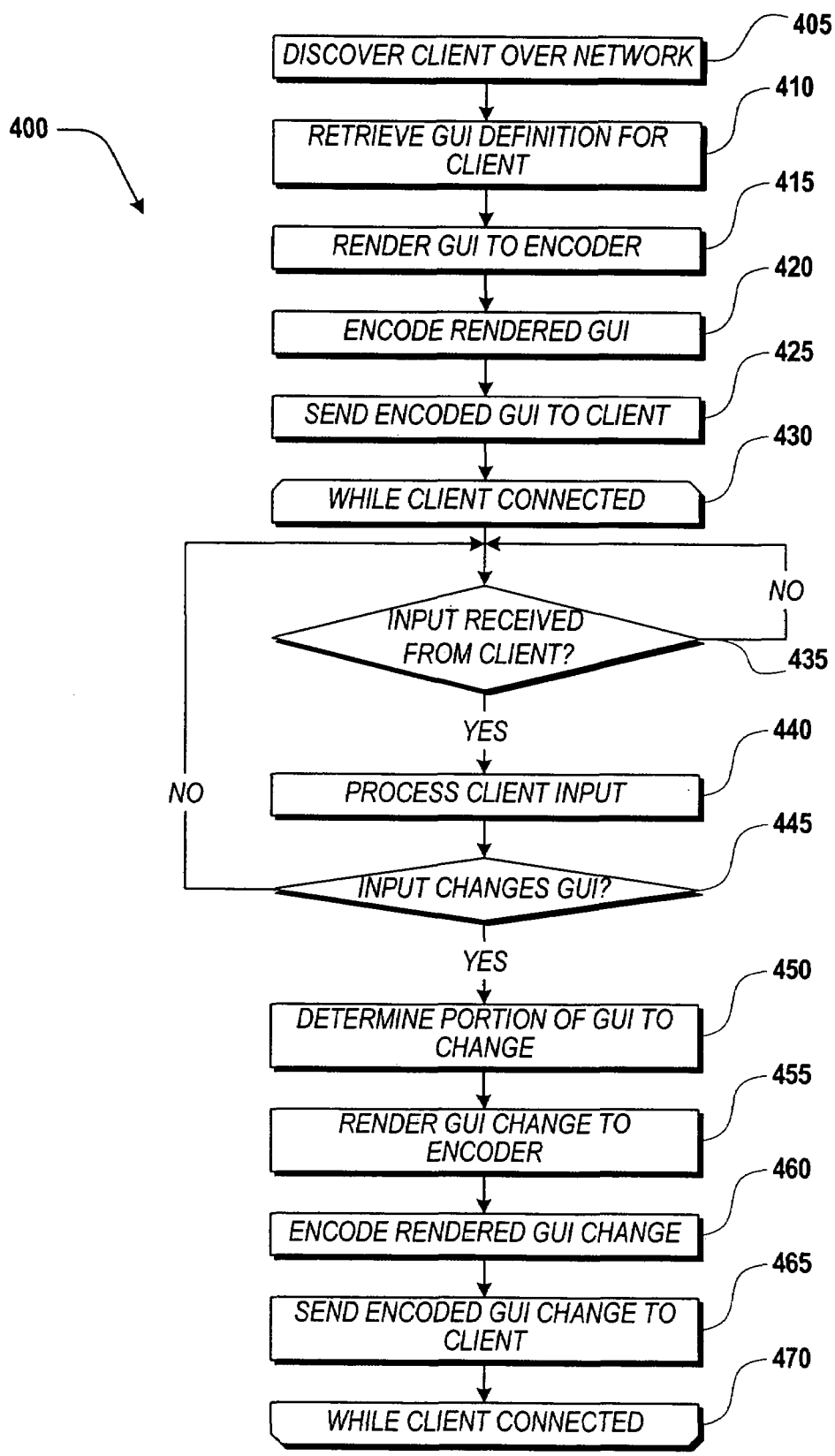
FIG. 4 illustrates the operational flow of relevant aspects of a process at the UPnP server for remoting a user interface to a UPnP client.

In accordance with the above-described communications between a UPnP server 200 and a UPnP client 110, FIG. 4 illustrates a process within the UPnP server 200 for remoting a user interface to a UPnP client 110. The remoting process 400 begins at block 405 where a UPnP client is discovered over the network 150. Next, in block 410 a GUI definition is retrieved for the discovered UPnP client. In block 415, an image of the GUI is rendered/redirected to an encoder (e.g., encoder module 265). In one exemplary embodiment the redirection of the GUI image to the encoder is via piping (e.g., using a UNIX "|" symbol or the like) to redirect the output of a GUI renderer 260 to an encoder module 265. In alternate embodiments, the image of the GUI is directed to an encoder or the UPnP client 110 through the execution of ActiveX instructions at the GUI renderer 260.

In some embodiments, the encoder module 265 is actually an optional component, as is the accompanying and block 420 in the remoting process 400, where the GUI image is encoded. As unencoded (raw) GUI images generally are of a large size, it is often desirable to encode raw GUI images to reduce processing, bandwidth utilization, memory utilization and/or storage issues when processing, storing and/or communicating GUI images. Accordingly, various encoding mechanisms may be used such as compressed bitmaps, TIF (Tagged Image Format) images, GIF (Graphical Interchange Format) images, JPG (Joint Photographic Experts Group) images, and the like.

Continuing process 400, in block 425 the encoded GUI image is sent to the UPnP client 110. Next, looping block 430 begins a loop. While the UPnP client 110 is connected with the UPnP server 200, the following actions are performed. In decision block 435, a determination is made whether input was received from the UPnP client 110. If no input was received, processing essentially loops back and waits until a determination in decision block 435 indicates that input was received. Once input is determined, in decision block 435, to have been received from the UPnP client 110, processing proceeds to block 440 where the UPnP client input is processed. Next, in decision block 445 a determination is made whether the input from the UPnP client 110 changes the appearance of the GUI. Note, the processing of client input may effect other changes at both the client and/or server level, however, the embodiments are directed at the remoting of the user interface and are less directed at the specifics of what any one user interface and/or its associated inputs may effectuate. Accordingly, if in decision block 445 no input changes were noted processing loops back to decision block 435. If, however, in decision block 445 it was determined that the client input changed the GUI, processing proceeds to block 450 where a determination is made as to what portion of the GUI changed. Block 455 renders the changed portion of the GUI to the encoder module 265. Note that while an encoder module 265 is referenced as a component of the UPnP server 200, in various embodiments a separate encoder module may be implemented in a separate device (not shown). The encoder module 265 encodes the rendered GUI change in block 460. Next, in block 465, the encoded GUI change is sent to the UPnP client 110. Remoting process 400 then proceeds to looping block 470, which cycles back to looping block 430 so long as the UPnP client 110 is connected to the UPnP server 200.

Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. This application is intended to cover any adaptations or variations of the embodiment discussed herein. Therefore, it is manifested and intended that the invention be limited only by the claims and the equivalents thereof.

The embodiments of the invention in which an inclusive property or privilege is claimed are hereby defined as follows:

1. An automated method of remoting a user interface by a UPnP server device for a UPnP rendering device, comprising:
 discovering by the UPnP server, a UPnP control point configured to control a UPnP rendering device that is equipped to display a GUI image, wherein discovering by the UPnP server includes receiving, by the UPnP server, device information about the UPnP rendering device from the UPnP control point, and wherein the device information includes a decoding and a display capability of the UPnP rendering device; and
 in response to said discovering, the UPnP server automatically:
  retrieving a GUI definition for said UPnP rendering device;
  rendering a GUI image on the UPnP server in accordance with said GUI definition based at least in part on the device information about the UPnP rendering device;
  encoding the rendered GUI image, by an encoder in the UPnP server, into a format that is suitable for viewing on the UPnP rendering device, based at least in part on receiving the decoding capability of the UPnP rendering device; and
  delivering, from the UPnP server, the encoded representation of said GUI image to said UPnP rendering device.

2. The method of claim 1, wherein the retrieving comprises retrieving by the UPnP server a file containing said GUI definition.

3. The method of claim 2, wherein said file describes said GUI definition in a format selected from one of: HTML, Flash, JavaScript, VBScript, JScript, PHP and XHTML.

4. The method of claim 1, wherein the retrieving comprises making a call by a module of the UPnP server to a definition generation program to generate said GUI definition.

5. The method of claim 1, wherein the rendering of said GUI definition comprises outputting by a module of the UPnP server said GUI image to a memory location of the UPnP server.

6. The method of claim 1, wherein the rendering comprises redirecting at least a portion of said GUI image by a display routine of the UPnP server to said encoder.

7. The method of claim 6, wherein said redirecting comprises piping by said display routine at least a portion of said GUI image to said encoder.

8. The method of claim 1, wherein the rendering is performed using a browser module of the UPNP server.

9. The method of claim 8, wherein said browser module comprises Internet Explorer.

10. The method of claim 6, wherein the redirecting of said GUI image comprises executing ActiveX instruction of the UPnP server.

11. The method of claim 1, further comprises receiving by the UPnP server, from the UPnP rendering device, user interaction with the GUI image.

12. The method of claim 11, further comprises determining by the UPnP server whether the user interaction results in any changes to the GUI image, and conditionally repeating by the UPnP server said rendering on the UPnP server and delivering from the UPnP server based at least in part on the result of said determining.

13. The method of claim 11, wherein the user interaction with the GUI image comprises a command to the UPnP server to provide a media content to the UPnP rendering device.

14. A computer storage medium comprising:
computer executable instructions designed to enable a UPnP server to remote a user interface to a UPnP rendering device by:
discovering a UPnP control point configured to control a UPnP rendering device that is equipped to display a GUI image, wherein discovering by the UPnP server includes receiving, by the UPnP server, device information about the UPnP rendering device, and wherein the device information includes a decoding and a display capability of the UPnP rendering device; and
in response to said discovering, automatically:
retrieving a GUI definition for said rendering device;
rendering a GUI image on the UPnP server in accordance with said GUI definition based at least in part on the device information about the UPnP rendering device;
encoding the rendered GUI image, by an encoder in the UPnP server, into a format that is suitable for viewing on the UPnP rendering device, based at least in part on receiving the decoding capability of the UPnP rendering device; and
delivering, from the UPnP server, the encoded representation of said GUI image to said UPnP rendering device.

15. The computer readable medium of claim 14, wherein said executable instructions are designed to enable the UPnP server to perform said retrieving by retrieving a file containing said GUI definition.

16. The computer readable medium of claim 15, wherein said file describes said GUI definition in a format selected from one of: HTML, Flash, JavaScript, VBScript, JScript, PHP and XHTML.

17. The computer readable medium of claim 14, wherein said executable instructions are designed to enable the UPnP server to perform retrieving by equipping the UPnP server with a module making a program call to a definition generation program that generates said GUI definition.

18. The computer readable medium of claim 14, wherein said executable instructions are designed to enable the UPnP server to perform said rendering by equipping the UPnP server to redirect a display routine of the UPnP server to said encoder.

19. A system comprising:
a processor;
a bus coupled to said processor;
a disk drive coupled to said processor; and
a memory comprising computer executable instructions, which are designed to enable the system to operate as a UPnP server, and to remote a user interface to a UPnP rendering device, when executed, by:
discovering a UPnP control point configured to control a UPnP rendering device that is equipped to display a GUI image, wherein discovering by the UPnP server includes receiving, by the UPnP server, device information about the UPnP rendering device, and wherein the device information includes a decoding and a display capability of the UPnP rendering device; and
in response to said discovering, automatically:
retrieving a GUI definition for said rendering device;
rendering a GUI image on the UPnP server in accordance with said GUI definition based at least in part on the device information about the UPnP rendering device;
encoding the rendered GUI image, by an encoder in the UPnP server, into a format that is suitable for viewing on the UPnP rendering device, based at least in part on receiving the decoding capability of the UPnP rendering device; and
delivering, from the UPnP server, a representation of said GUI image to said UPnP rendering device.

20. The system of claim 19 wherein said executable instructions are designed to perform said retrieving by retrieving a GUI definition file in a format selected from one of: HTML, Flash, JavaScript, VBScript, JScript, PHP and XHTML.

21. The system of claim 19 wherein said executable instructions are designed to perform said retrieving by executing a program call to a definition generation program that generates said GUI definition.

22. The system of claim 19, wherein said executable instructions are further designed to perform said rendering by redirecting at least a portion of said GUI image to said encoder.

23. The system of claim 19, wherein said executable instructions are further designed to receive from the UPnP rendering device, user interaction with the GUI image.

24. The system of claim 23, wherein said executable instructions are further designed to determine whether the user interaction results in any changes to the GUI image, and conditionally repeating said rendering on the UPnP Server and delivering from the UPnP server based at least in part on the result of said determining.

25. The system of claim 19, wherein the user interaction with the GUI image comprises a command to the system to provide a media content to a UPnP rendering device.

* * * * *